United States Patent [19]

King et al.

[11] Patent Number: 4,678,630

[45] Date of Patent: Jul. 7, 1987

[54] SPACER GRID INSERT

[75] Inventors: Raymond A. King, Lynchburg; Jeffrey G. Larson, Rustburg; Lewis A. Walton, Forest, all of Va.

[73] Assignee: The Babcock & Wilcox Company, New Orleans, La.

[21] Appl. No.: 798,148

[22] Filed: Nov. 15, 1985

Related U.S. Application Data

[63] Continuation of Ser. No. 520,022, Aug. 3, 1983, abandoned.

[51] Int. Cl.4 ................................................. G21C 3/32
[52] U.S. Cl. .................................................... 376/438
[58] Field of Search ............... 376/449, 438, 441, 442, 376/353, 445, 462

[56] References Cited

U.S. PATENT DOCUMENTS

| | | | |
|---|---|---|---|
| 3,791,466 | 2/1974 | Patterson et al. | 376/449 X |
| 3,954,560 | 5/1976 | Delafosse et al. | 376/442 |
| 3,997,394 | 12/1976 | Aisch et al. | 376/449 X |
| 4,081,324 | 3/1978 | Flora et al. | 376/442 X |
| 4,119,490 | 10/1978 | Delafosse | 376/449 X |
| 4,120,751 | 10/1978 | Bezold | 376/449 X |
| 4,124,443 | 11/1978 | Bezold | 376/449 X |
| 4,135,972 | 1/1979 | Anthony et al. | 376/442 |
| 4,175,004 | 11/1979 | Jabsen | 376/441 |
| 4,208,248 | 6/1980 | Jabsen | 376/449 |
| 4,221,636 | 9/1980 | Feutrel | 376/441 |
| 4,239,597 | 12/1980 | Christiansen | 376/442 X |
| 4,294,660 | 10/1981 | Christiansen | 376/442 |

FOREIGN PATENT DOCUMENTS 0007688 2/1980 European Pat. Off. ............ 376/449

Primary Examiner—Deborah L. Kyle
Assistant Examiner—Daniel Wasil
Attorney, Agent, or Firm—Robert J. Edwards; Mark B. Quatt

[57] ABSTRACT

In nuclear reactor fuel assembly of the floating grid type, a spacer grid insert positioned concentrically about the central instrument guide tube prevents damage to instrument guide tube saddles caused by axial load, while permitting limited movement of the spacer grids.

2 Claims, 5 Drawing Figures

SPACER GRID INSERT

This application is a continuation of application Ser. No. 06/520,022 filed Aug. 3, 1983, now abandoned.

BACKGROUND OF THE INVENTION

The present invention relates to nuclear reactor fuel element assemblies and, more particularly, to a type of fuel assembly characterized by elongated cylindrical fuel rods supported in a bundle, the fuel rods being substantially parallel to each other. Such a fuel assembly typically employs spacer grids located at regular intervals along its length. These spacer grids are typically made from slotted thin metal strips interlocked in an egg crate arrangement and joined at their intersections by welds. The spacer grids help to locate and support the fuel rods. Specifically, the fuel rods are passed axially through the square openings formed by the interlocking metal strips of the spacer grid, and are positioned by hard (i.e. inflexible) and soft (i.e. flexible) stops formed from the side walls in each grid cell.

In present practice, control rod guide tubes and an instrument guide tube are interspersed in a regular pattern through the fuel rod array. The guide tubes are unfueled elongated cylinders similar to the fuel rods.

In a typical arrangement, a 15×15 array of fuel rods is employed, in which the center position in the array is reserved for a central instrument guide tube. Another sixteen positions are provided with guide tubes for use as control rod locations.

The control rod guide tubes are open at their upper ends to permit passage of control rods into the fuel assembly for the purpose of regulating the fission reaction. Similarly, the instrument guide tube is open at its lower end to permit passage of an instrument probe into the fuel assembly for the purpose of monitoring the neutronic and thermal conditions in the fuel assembly during operation. Typically, the guide tubes are rigidly attached by threaded mechanical joints or welds at each end to upper and lower end fittings.

These end fittings consist of a grillage with openings to accommodate the guide tube ends and to permit the passage of coolant flow through the fuel assembly. Other structural features are typically attached to these grillages to facilitate the positioning of the fuel assembly in the reactor core and to interface with handling devices. One or more helical springs are mounted on the upper end fitting to prevent fuel assembly lift-off caused by the upward flow of coolant through the fuel assembly.

In many current fuel assembly designs, the spacer grids discussed above are rigidly fixed to the guide tubes either by welding or by mechanical attachment. At variance with this rigid design is the floating grid arrangement shown in the Babcock & Wilcox fuel assembly design, in which no mechanical attachment or weldment is provided. Instead, the spacer grids are left free to slip axially along the guide tubes to accommodate minor changes in the axial length of the fuel rods during irradiation.

Spacer sleeves located around the central instrument guide tube are designed to prevent excessive axial relocation of the spacer grids during irradiation. These sleeves are typically located axially between the spacer grids, i.e. in the axial intervals between spacer grids, and are sized to be shorter than the distance between adjacent spacer grids, leaving a gap for axial relocation of the spacer grids.

The spacer grids of the Babcock & Wilcox design have found to "float" upward on the fuel rod bundle during irradiation. This occurs during the third cycle with grids made of Inconel, and during the first cycle with Zircaloy grids. The Zircaloy grids also move more once they begin to slip, going to the limits provided by the spacer sleeves rather than moving only a fraction of an inch as occurs with the use of Inconel as a grid material.

The central instrument tube is positioned in the spacer grid by saddles which are formed from the spacer grid strips. These saddles are dimples or projections which protrude from the top and bottom edge of the central spacer grid strips. These saddles are relatively weak and can be turned inside out by the spacer sleeves if sufficient upward force is exerted by the grid. The Zircaloy grid saddles are only about one-half as strong as the Inconel grid saddles.

The spacer sleeves bear on the top and bottom edges of the upper and lower saddles respectively at different times in an operating cycle. If a high axial load is applied to the spacer sleeves by the grid, the saddles may fail as cantilever beams turning inward and damaging the grid. A relative displacement of the spacer grid with respect to adjacent fuel assemblies may occur, causing possible fretting of fuel rods and a more uneven reactor core geometry. A need thereof arises to find a means for limiting spacer grid axial displacement more than is possible presently, in order to insure grid overlap between adjacent fuel assemblies.

Several possible arrangements have been investigated to resolve this problem. Direct attachment means, such as welding the spacer grids to the guide tubes, is undesirable for two reasons: the manufacturing sequence is severely disrupted, and the basic advantages associated with a floating grid arrangement are lost. Swaging the central instrument guide tubes above and below the grids in order to limit travel is a feasible alternative, but also significantly alters the fabrication sequence.

The best approach is to retain the floating grid concept, lengthen the spacer sleeve to achieve the grid positioning improvement required, and strengthen the central instrument guide tube saddles, (especially on the Zircaloy spacer grid) to carry the resulting loads.

SUMMARY OF THE INVENTION

In a nuclear reactor fuel assembly employing a plurality of spacer grids located along the length of the fuel assembly, said spacer grids in limited movable relationship to at least one guide tube, and a plurality of spacer sleeves positioned concentrically about respective axial portions of a central instrument guide tube, the improvement comprises at least one spacer grid insert positioned within a spacer grid and concentrically about an axial portion of the central instrument guide tube, said insert including a shoulder along the axially upper end thereof.

BRIEF DESCRIPTION OF THE DRAWINGS

In the accompanying drawings the various figures are as follows.

DESCRIPTION OF THE PREFERRED EMBODIMENTS

Figure 1:
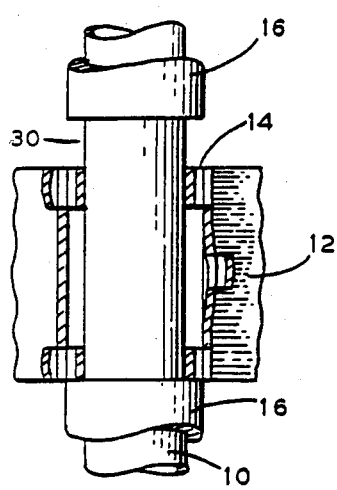
FIG. 1 is a side view of a portion of a central instrument guide tube.

Referring now to the drawings wherein like reference numerals designate like or corresponding parts throughout the several views, FIG. 1 shows a portion of an instrument guide tube 10. The portion depicted in the drawing is at an elevation at which a spacer grid 12 positions the central instrument guide tube 10. As described above, spacer grid 12 consists of thin metal slotted strips, fabricated in egg crate fashion, to position the fuel rods in a fuel assembly. At the central instrument guide tube, these spacer grids have instrument guide tube saddles 14, which are dimples or projections protruding from the top and bottom of the edge of a spacer grid, and contacting the instrument guide tube. A spacer sleeve 16 is positioned concentrically about the instrument guide tube and between two axially adjacent spacer grids or above and below the uppermost and lowermost spacer grids respectively. A displacement space 30 is provided between the ends of the spacer sleeve 16 and the upper edge or lower edge, or both, of the spacer grid 12. In the current art, the spacer grids may move upward on the instrument guide tube during operating cycles and exert sufficient axial load on the spacer sleeve 16 to cause the instrument guide tube saddles 14 to fail as cantilever beams turning inward and damage the spacer grid 12.

Figure 2:
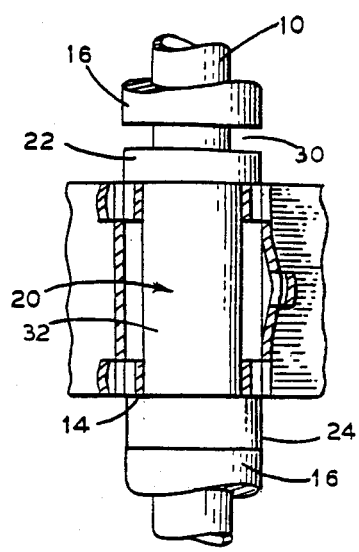
FIG. 2 is a side view of a portion of a central instrument guide tube showing a spacer grid insert according to the invention.

FIG. 2 shows a spacer grid insert 20 which is positioned concentrically about the central instrument guide tube 10. The insert 20 includes a tubular portion 32 and a circular flange portion 22, alternatively referred to herein as insert shoulder 22, formed on one end of the tubular portion. The circular flange portion 22, as best shown in FIG. 2, is positioned in the displacement space 30 and abuts against the upper edge of the spacer grid 12. The circular flange portion 22 has a circular outer surface with substantially the same outer diameter as the spacer sleeve 16. The circular flange portion 22 maintains downward engagement of the insert with the grid during fabrication of the fuel assembly and early in the operating life of the assembly. Upward engagement of the insert with the grid can be insured by means of a collar 24 connected to the insert below the grid by, for example, spot welding. the collar 24 also has a circular surface with, as shown in FIG. 2, the same outer diameter as the spacer sleeve 16. Thus, the circular flange portion 32 alone, or with the collar 24, reduces the length of the displacement space and precludes direct contact of the spacer sleeve 16 against the spacer grid 12. Alternatively, the insert can be simply made long enough to prevent disengagement. The insert 20 can also be welded to the saddles 14. In each case, the spacer grid insert 20 carries all through-grid loads while the instrument guide tube saddles 14 are strengthened against grid-induced loads by the internal support provided by the insert and by the decreased overhang of the saddles 14 which lessens the cantilever effect.

One preferred configuration is to size the spacer grid insert 20 so that it has the same outside diameter as the control rod guide tubes. This allows control rod guide tube saddles to be substituted for the instrument guide tube saddles 14 in the central grid cell.

Figure 3:
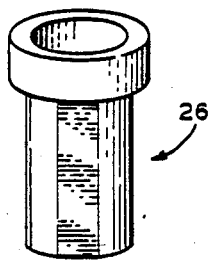
FIG. 3 is a perspective view of an alternate embodiment of the invention.

Alternatively, the saddles 14 can be eliminated altogether and a squared-off insert 26 can be used as shown in FIG. 3.

One distinct advantage to the invention is that no significant change to the fuel assembly fabrication process is required in order to incorporate the improved grid-positioning control. The spacer grid inserts 20 are placed into the spacer grids 12 prior to fuel bundle assembly. If a permanent attachment scheme is employed, this attachment operation would also be done at this point in the fabrication process. The spacer grids 12, now with the spacer grid inserts installed, are then keyed open and installed into the fuel assembly fixture in a manner well known in the art, with the exception that part-length keys must be used in the two center cell rows blocked by the insert. The fuel rods, spacer sleeves 16, and control rod guide tubes and central instrument guide tube 10 are then loaded in the conventional manner. The spacer sleeve 16 may be longer than the lengths previously employed to achieve the desired grid positioning.

Figure 4:
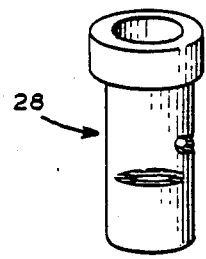
FIG. 4 is a perspective view of still another alternate embodiment of the invention.

The part-length keys discussed above, for use in the center cell rows, may be eliminated and replaced by standard keys if passages are provided through the spacer grid insert. FIG. 4 shows a spacer grid insert 28 modified by the inclusion of such passages.

Figure 5:
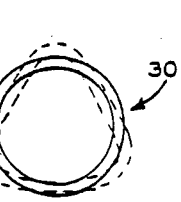
FIG. 5 is a cross-sectional view of still another alternate embodiment of the invention.

Spacer grid inserts in accordance with the present invention prevent the instrument guide tube from being as rigidly restrained at the spacer grid elevations as they currently are. If a fretting problem results, alternate restraint means can be provided by ovalizing the free end of the insert as shown in FIG. 5, creating a modified insert 30 characterized by three protruding portions arranged at about 120° with respect to each other. Thus, a spacer grid insert in accordance with the present invention provides a simple, economic means for using a floating grid arrangement even if greater position restraint is required. Undesirable structural changes such as welding or swaging of the instrument guide tubes is avoided, and the problem of axial load deformation of the instrument guide tube saddles is solved. In addition, the fabrication process is not significantly altered by the practice of the invention.

What is claimed is:

1. An improved floating spacer grid in combination with a nuclear fuel assembly of the type having a plurality of parallel fuel rods and at least one guide tube maintained in a laterally spaced array by axially spaced spacer grids, the fuel rods and guide tube extending through the spacer grids, the guide tube having a uniform circular outer surface, the spacer grids being movably mounted to the guide tube to permit axial displacement of the spacer grids relative the guide tube, saddles formed from and within the spacer grids at top and bottom edges of the grids, a spacer sleeve positioned concentrically about the guide tube intermediate the adjacent ones of the axially-spaced spacer grids for limiting axial displacement of the spacer grids, and the spacer sleeve having opposite ends closely spaced from the edges of the adjacent spacer grids to define a displacement space therebetween, the improvement comprising, in combination therewith, a plurality of tubular inserts, each insert mounted to the guide tube within each of the spacer grids, each insert including a tubular portion positioned by the saddles to circumscribe the guide tube within the spacer grid and a circular flange portion at one end of the tubular portion, the flange portion being positioned in the displacement space and abutted to the edge of the spacer grid on the saddles, intermediate the spacer grid and spacer sleeve, and the circular flange portion having substantially the same outer diameter as the spacer sleeve thus precluding direct contact of the spacer sleeve with the spacer grid, and whereby the inserts carry all axial through-grid loads and prevent a horizontal vector force component applied against said grids.

2. The improvement according to claim 1 wherein the insert includes a circular collar at the end of the tubular portion opposite the circular flange portion, said circular collar being abutted to the edge of the spacer grid opposite the first-mentioned edge.

* * * * *